US012616863B2

(12) United States Patent
Lee et al.

(10) Patent No.: US 12,616,863 B2
(45) Date of Patent: May 5, 2026

(54) LITHIUM ION BATTERY FIRE SUPPRESSANT CONTAINING EXTINGUISHING POWDER MIXED WITH ORGANIC BINDER AND LITHIUM ION BATTERY FIRE SUPPRESSION SHEET COMPRISING THE SAME

(71) Applicant: TL CO., LTD., Goyang-si (KR)

(72) Inventors: Sang Cheal Lee, Hwaseong-si (KR); Jaeseong Oh, Siheung-si (KR)

(73) Assignee: TL-X Co., Ltd., Goyang-si (KR)

( * ) Notice: Subject to any disclaimer, the term of this patent is extended or adjusted under 35 U.S.C. 154(b) by 599 days.

(21) Appl. No.: 18/161,076

(22) Filed: Jan. 29, 2023

(65) Prior Publication Data

US 2024/0017111 A1     Jan. 18, 2024

Related U.S. Application Data

(63) Continuation-in-part of application No. PCT/KR2023/000780, filed on Jan. 17, 2023.

(30) Foreign Application Priority Data

| Jul. 15, 2022 | (KR) | ........................ 10-2022-0087704 |
| Nov. 18, 2022 | (KR) | ........................ 10-2022-0155175 |

(51) Int. Cl.
| *A62D 1/06* | (2006.01) |
| *A62C 3/16* | (2006.01) |
| | (Continued) |

(52) U.S. Cl.
CPC ................. *A62D 1/06* (2013.01); *A62C 3/16* (2013.01); *A62C 35/10* (2013.01); *A62C 99/0045* (2013.01); *B32B 5/02* (2013.01); *B32B 5/26* (2013.01); *C08K 3/26* (2013.01);
*C09J 11/04* (2013.01); *H01M 10/0525* (2013.01); *H01M 10/486* (2013.01); *H01M 50/204* (2021.01); *H01M 50/233* (2021.01); *H01M 50/276* (2021.01); *H01M 50/278* (2021.01); *H01M 50/28* (2021.01); *H01M 50/282* (2021.01);
(Continued)

(58) Field of Classification Search
CPC ............ H01M 50/278; H01M 50/276; H01M 50/282; H01M 50/293; H01M 50/291; H01M 50/28; H01M 50/204; H01M 50/233; H01M 10/0525; H01M 10/486; A62D 1/06; A62C 3/16; A62C 35/10; A62C 99/0045; B32B 5/02; B32B 5/26; C08K 3/26; C09J 11/04
USPC ..................................... 429/50, 62, 156, 159
See application file for complete search history.

(56) References Cited

U.S. PATENT DOCUMENTS

| 2011/0159341 A1* | 6/2011 | Iwamoto | ............... H01M 50/24 429/120 |
| 2022/0173463 A1* | 6/2022 | Yamamoto | .......... H01M 50/126 |

FOREIGN PATENT DOCUMENTS

| CN | 112599871 A | * | 4/2021 | ........ H01M 10/4207 |
| CN | 113707971 A | * | 11/2021 | ............ H01M 50/10 |
(Continued)

*Primary Examiner* — Sean P Cullen
(74) *Attorney, Agent, or Firm* — WTA IP Law P.C.

(57) ABSTRACT

Disclosed herein are a lithium ion battery fire suppressant capable of effectively suppressing a fire of a lithium ion battery and a lithium ion battery fire suppression sheet including the same. The lithium ion battery fire suppressant includes an extinguishing powder and an organic binder mixed with the extinguishing powder.

6 Claims, 5 Drawing Sheets

(51) Int. Cl.

| | | |
|---|---|---|
| *A62C 35/10* | (2006.01) |
| *A62C 99/00* | (2010.01) |
| *B32B 5/02* | (2006.01) |
| *B32B 5/26* | (2006.01) |
| *C08K 3/26* | (2006.01) |
| *C09J 11/04* | (2006.01) |
| *H01M 10/0525* | (2010.01) |
| *H01M 10/48* | (2006.01) |
| *H01M 50/204* | (2021.01) |
| *H01M 50/233* | (2021.01) |
| *H01M 50/276* | (2021.01) |
| *H01M 50/278* | (2021.01) |
| *H01M 50/28* | (2021.01) |
| *H01M 50/282* | (2021.01) |
| *H01M 50/291* | (2021.01) |
| *H01M 50/293* | (2021.01) |

(52) U.S. Cl.
CPC ....... *H01M 50/291* (2021.01); *H01M 50/293* (2021.01); *B32B 2250/20* (2013.01); *B32B 2250/40* (2013.01); *B32B 2255/02* (2013.01); *B32B 2255/24* (2013.01); *B32B 2307/3065* (2013.01); *C08K 2003/262* (2013.01); *C08K 2003/267* (2013.01); *H01M 2200/10* (2013.01)

(56)          References Cited

FOREIGN PATENT DOCUMENTS

| | | | |
|---|---|---|---|
| JP | 2021 118847 A | 8/2021 |
| KR | 2022 0033588 A1 | 3/2022 |
| KR | 10-2022-0125085 | 9/2022 |
| WO | WO-2020203684 A1 * | 10/2020 | .......... H01M 50/242 |

* cited by examiner

LITHIUM ION BATTERY FIRE SUPPRESSANT CONTAINING EXTINGUISHING POWDER MIXED WITH ORGANIC BINDER AND LITHIUM ION BATTERY FIRE SUPPRESSION SHEET COMPRISING THE SAME

CROSS-REFERENCE TO RELATED APPLICATIONS

This is a bypass continuation of International PCT Patent Application No. PCT/KR2023/000780 filed on Jan. 17, 2023, which claims priority to Republic of Korea Patent Application No. 10-2022-0087704 filed on Jul. 15, 2022, and Republic of Korea Patent Application No. 10-2022-0155175 filed on Nov. 18, 2022, which are incorporated by reference herein in their entirety.

TECHNICAL FIELD

The present invention relates to a lithium ion battery fire suppressant and a lithium ion battery fire suppression sheet including the same and, more particularly, to a lithium ion battery fire suppressant capable of effectively suppressing a fire of a lithium ion battery and a lithium ion battery fire suppression sheet including the same.

BACKGROUND

A battery having a high degree of accumulation of electric energy is vulnerable to impact.

Such a battery can emit accumulated high energy in an instant due to an internal defect or external shock, resulting in thermal runaway and then fire in a short time, which leads to unwanted accidents that are difficult to address.

Conventional measures related to a battery fire are focused on how to extinguish the fire after it occurs.

Lithium melts at 108.5° C. and begins to boil rapidly at 500° C. or higher. In the case of a lithium ion battery, the main component of a white gas generated upon thermal runaway is lithium vapor. As lithium begins to boil, the pressure of a battery cell increases. Lithium completely boils at 1337° C. When the battery cell explodes, lithium gas rapidly reacts with oxygen and generates flame and heat, resulting in thermal runaway.

TABLE 1

| Relation between temperature and vapor pressure of lithium | | | | | | |
|---|---|---|---|---|---|---|
| | Pressure (vapor pressure) | | | | | |
| | 0.00001 | 0.0001 | 0.001 | 0.01 | 0.1 | 1 |
| Temperature (° C.) | 524 | 612 | 722 | 871 | 1064 | 1337 |

Although this phenomenon is somewhat caused by organic matter inside the battery cell, the main cause thereof lies in the fact that a lithium ion becomes lithium metal by gaining an electron and evaporates by itself, or forms lithium nitride by combining with nitrogen in the air, as shown in Reaction Equation 1 and Reaction Equation 2:

$$Li^+ + e^- \rightarrow Li \tag{1}$$

$$6Li + N_2 \rightarrow 2Li_3N \tag{2}$$

Lithium or lithium nitride oxidizes into lithium peroxide or lithium oxide while generating high heat through rapid reaction with water vapor or oxygen, as shown in Reaction Equation 3 to Reaction Equation 5.

$$4Li + O_2 \rightarrow 2Li_2O \tag{3}$$

$$4Li + 2H_2O + O_2 \rightarrow 4LiOH \tag{4}$$

$$2Li + H_2O \rightarrow Li_2O + H_2 \tag{5}$$

Therefore, conventional measures focused on how to extinguish a fire after it occurs are not proper ways to address a lithium ion battery fire.

That is, there is a need for a technology that can prevent thermal runaway of a battery or can rapidly suppress thermal runaway of the battery after it occurs.

SUMMARY

Embodiments of the present invention are conceived to solve such problems in the art and it is an aspect of the present invention to provide a lithium ion battery fire suppressant capable of effectively suppressing a fire of a lithium ion battery and a lithium ion battery fire suppression sheet including the same.

It will be understood that aspects of the present invention are not limited to the above. The above and other aspects of the present invention will become apparent to those skilled in the art from the detailed description of the following embodiments in conjunction with the accompanying drawings.

In accordance with one aspect of the present invention, there is provided a lithium ion battery fire suppressant for suppressing a fire of a lithium ion battery, including: an extinguishing powder; and an organic binder mixed with the extinguishing powder.

The extinguishing powder may include at least one selected from among sodium carbonate ($Na_2CO_3$), sodium bicarbonate ($NaHCO_3$), potassium carbonate ($K_2CO_3$), potassium bicarbonate ($KHCO_3$), magnesium hydrogen carbonate ($Mg(HCO_3)_2$), magnesium carbonate ($MgCO_3$), calcium carbonate ($CaCO_3$), calcium bicarbonate ($Ca(HCO_3)_2$), ammonium carbonate ($(NH_4)_2CO_3$), and ammonium bicarbonate ($NH_4HCO_3$).

The organic binder may include at least one selected from among an organic adhesive and an elastomer.

The lithium ion battery fire suppressant may be prepared in paste form to be applied to an inner surface of a case housing the lithium ion battery.

The lithium ion battery fire suppressant may be molded into a pad having elasticity. When multiple lithium ion batteries are provided, the pad may be disposed between at least one pair of adjacent lithium ion batteries.

In accordance with another aspect of the present invention, there is provided a lithium ion battery fire suppression sheet including: a pair of fiber sheets; and the lithium ion battery fire suppressant set forth above, the lithium ion battery fire suppressant being disposed between the pair of fiber sheets.

The lithium ion battery fire suppression sheet may cover at least a portion of a lithium ion battery.

The lithium ion battery fire suppression sheet may further include: a heating wire disposed on one of the pair of fiber sheets and connected to a lithium ion battery; and a switch connected to the heating wire and allowing electric current to be supplied from the lithium ion battery to the heating wire disposed on the fiber sheet upon detection of a temperature exceeding a predetermined maximum allowable temperature so as to heat the heating wire.

According to embodiments of the present invention, the lithium ion battery fire suppressant or the lithium ion battery fire suppression sheet is disposed to cover or adjoin a lithium ion battery. Accordingly, in the event of a fire in the lithium ion battery, the carbonate powder decomposes and produces carbon dioxide, such that supply of oxygen to the fire can be cut off due to suffocating properties of carbon dioxide. In this way, the spread of flames caused by a lithium ion battery fire can be effectively mitigated or suppressed.

It will be understood that advantageous effects of the present invention are not limited to the above and include any advantageous effects conceivable from the features disclosed in the detailed description of the present invention or the appended claims.

BRIEF DESCRIPTION OF DRAWINGS

The above and other aspects, features, and advantages of the present invention will become apparent from the detailed description of the following embodiments in conjunction with the accompanying drawings.

DETAILED DESCRIPTION

Hereinafter, exemplary embodiments of the present invention will be described in detail with reference to the accompanying drawings.

Figure 1:
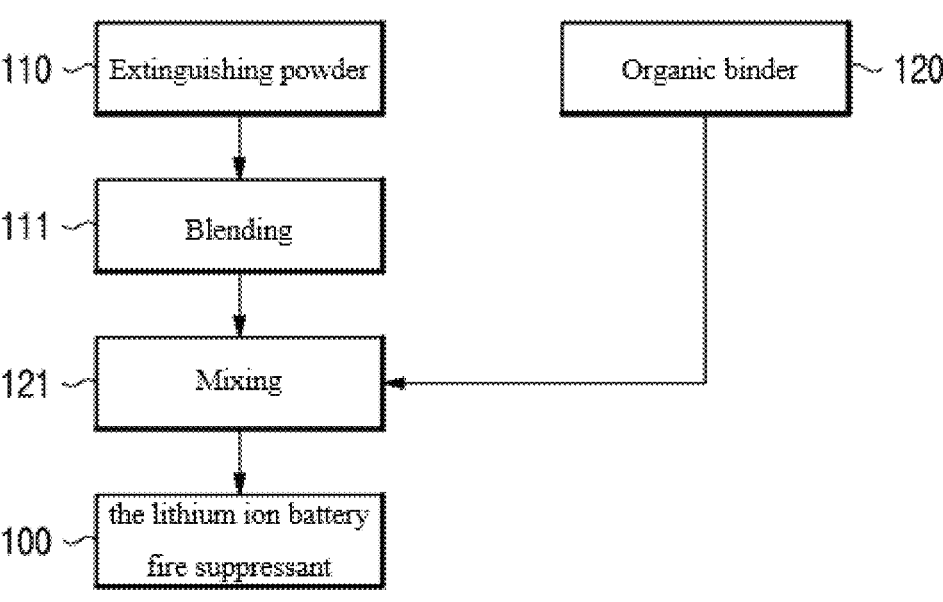
FIG. 1 is a schematic diagram of a process of preparing a lithium ion battery fire suppressant according to one embodiment of the present invention.

FIG. 1 is a schematic diagram of a process of preparing a lithium ion battery fire suppressant according to one embodiment of the present invention.

Referring to FIG. 1, the lithium ion battery fire suppressant 100 is configured to suppress a lithium ion battery fire, and may include an extinguishing powder 110 and an organic binder 120.

The extinguishing powder 110 may be a combination of a monovalent or divalent cation and a carbonate ion having suffocating properties and reactivity with lithium.

The extinguishing powder 110 may include an inorganic salt powder. The inorganic salt powder may include an alkali metal, an alkaline earth metal, and an ammonium-based material in the periodic table that have high oxygen radical absorbance capacity.

The alkali metal may include at least one selected from among sodium carbonate ($Na_2CO_3$), sodium bicarbonate ($NaHCO_3$), potassium carbonate ($K_2CO_3$), and potassium bicarbonate ($KHCO_3$).

The alkaline earth metal may include at least one selected from among magnesium hydrogen carbonate ($Mg(HCO_3)_2$), magnesium carbonate ($MgCO_3$), calcium carbonate ($CaCO_3$), and calcium bicarbonate ($Ca(HCO_3)_2$).

The ammonium-based material may include at least one selected from among ammonium carbonate ($(NH_4)_2CO_3$) and ammonium bicarbonate ($NH_4HCO_3$).

Specifically, the extinguishing powder 110 may include an inorganic carbonate powder.

Upon heating, the carbonate powder decomposes and produces a reactive decomposition gas and cationic metal ions.

The reactive decomposition gas can cause a flammable gas (lithium gas) emitted from a lithium ion battery on fire to be become non-flammable. The reactive decomposition gas produced by heat-induced decomposition of the carbonate powder may be carbon dioxide ($CO_2$).

In addition, the cationic metal ions can absorb radicals generated from an electric spark or flame, thereby interrupting chain reaction of combustion.

As shown in Reaction Equation 6 and Reaction Equation 7, in the event of a fire in a lithium ion battery, the carbonate powder decomposes by heat from the fire and produces carbon dioxide. Then, lithium vapor is converted into carbonate and becomes non-flammable.

As such, by cutting off supply of oxygen using suffocating properties of carbon dioxide produced by decomposition of the carbonate powder, the spread of flames caused by a lithium ion battery fire can be effectively mitigated or suppressed.

$$4Li + 2CO_2 + O_2 \rightarrow 2Li_2CO_3 \qquad (6)$$

$$2Li + 2CO_2 + H_2O + \tfrac{1}{2}O_2 \rightarrow 2LiHCO_3 \qquad (7)$$

Radical ions are generated due to a spark generated inside the lithium ion battery. As described above, when the carbonate powder decomposes by heat, the carbonate powder produces cationic metal ions (for example, an alkali metal or an alkaline earth metal).

The cationic metal ions can absorb the radical ions. This allows suppression of generation of sparks and prevention of ignition of the lithium ion battery. That is, due to this negative catalytic effect of the cationic metal ions, the chain reaction of combustion of the lithium ion battery can be inhibited. Accordingly, it is possible to extinguish a lithium ion battery fire at an early stage and to suppress the spread of the fire.

The extinguishing powder may be prepared by blending one or more carbonate powders selected from among sodium carbonate ($Na_2CO_3$), sodium bicarbonate ($NaHCO_3$), potassium carbonate ($K_2CO_3$), potassium bicarbonate ($KHCO_3$), magnesium hydrogen carbonate ($Mg(HCO_3)_2$), magnesium carbonate ($MgCO_3$), calcium carbonate ($CaCO_3$), calcium bicarbonate ($Ca(HCO_3)_2$), ammonium carbonate ($(NH_4)_2CO_3$), and ammonium bicarbonate ($NH_4HCO_3$), based on decomposition initiation temperatures thereof shown in Table 2.

TABLE 2

| Item | Formula | Molecular weight | Decomposition initiation temperature (° C.) |
|---|---|---|---|
| Ammonium bicarbonate | NH$_4$HCO$_3$ | 79.06 | 41-45 |
| Ammonium carbonate | (NH$_4$)$_2$CO$_3$ | 96.09 | 60 |
| Sodium bicarbonate | NaHCO$_3$ | 84 | 80 |
| Sodium carbonate | Na$_2$CO$_3$ | 105.99 | 100 |
| Potassium bicarbonate | KHCO$_3$ | 100.1 | 100-120 |
| Potassium carbonate | K$_2$CO$_3$ | 138.2 | 850 |
| Magnesium carbonate | MgCO$_3$ | 84.3 | 350 (anhydride) 165 (trihydrate) |

Here, the decomposition initiation temperature may refer to a temperature at which a corresponding carbonate powder begins to decompose. As shown in Table 2, each carbonate powder may have its own decomposition initiation temperature. Thus, carbonate powders having a decomposition initiation temperature meeting user needs may be selected and blended (step 111).

Examples of carbonate powder blending are listed in Table 3.

TABLE 3

| | Decomposition initiation temperature | | |
|---|---|---|---|
| | 60° C. | 100° C. | 150° C. |
| Ammonium carbonate | 55 wt % | 10 wt % | |
| Potassium bicarbonate | 20 wt % | 60 wt % | 10 wt % |
| Magnesium carbonate | 5 wt % | 10 wt % | 70 wt % |

A user may select a desired decomposition initiation temperature. Here, the user may be a manufacturer of a lithium ion battery or a manufacturer of a product equipped with a lithium ion battery.

In use of a lithium ion battery, a temperature range considered to be dangerous may vary from user to user. For example, one user may consider that a fire is likely to occur or has occurred in the lithium ion battery when a temperature of 60° C. or higher is reached. Another user may consider that a fire is likely to occur or has occurred in the lithium ion battery when a temperature of 100° C. or higher is reached.

As such, a temperature of the lithium ion battery considered to be dangerous may vary from user to user. Accordingly, when a specific temperature range is determined to be dangerous by a user, among the listed carbonate powders, some carbonate powders that have a decomposition initiation temperature falling within the dangerous temperature range or a decomposition initiation temperature out of the dangerous temperature range may be appropriately selected and blended.

For example, when a temperature determined to be dangerous by a user is 60° C., the extinguishing powder may include 55 wt % of ammonium carbonate, 20 wt % of potassium bicarbonate, and 5 wt % of magnesium carbonate. The extinguishing powder may be formed by blending these carbonate powders. In this way, when a temperature of 60° C., which is considered to be dangerous, is reached, ammonium carbonate, which accounts for the largest weight percentage of the extinguishing powder, is decomposed first, such that a primary extinguishing operation is performed. If the temperature of the lithium ion battery increases to 100° C. to 120° C. despite the primary extinguishing operation, potassium bicarbonate, which accounts for the second largest weight percentage of the extinguishing powder, is decomposed, such that a secondary extinguishing operation is performed. In addition, if the temperature of the lithium ion battery increases to the decomposition initiation temperature of magnesium carbonate despite the secondary extinguishing operation, a tertiary extinguishing operation by means of magnesium carbonate is performed. That is, as the temperature of the lithium ion battery increases, a stepwise extinguishing process may be performed.

If the extinguishing powder includes only a carbonate powder having a decomposition initiation temperature falling within the dangerous temperature range, the extinguishing powder can be exhausted during an extinguishing operation through decomposition of the carbonate powder at the decomposition initiation temperature. Accordingly, if a lithium ion battery fire fails to be completely suppressed despite the extinguishing operation, occurrence of thermal runaway cannot be delayed since it is impossible to prevent subsequent rapid increase in fire temperature. This can have negative results, such as failure of a driver to evacuate a vehicle in time.

Conversely, the stepwise extinguishing process according to the present invention can prevent rapid increase in fire temperature and thus can delay occurrence of thermal runaway. This can have positive results, such as giving a driver time to evacuate a vehicle.

Then, the organic binder 120 may be mixed with the extinguishing powder (step 121).

The lithium ion battery fire suppressant 100 may include 60 wt % to 95 wt % of the extinguishing powder and 5 wt % to 40 wt % of the organic binder 120. Preferably, the lithium ion battery fire suppressant 100 includes 80 wt % of the extinguishing powder and 20 wt % of the organic binder 120.

The organic binder 120 may include at least one selected from among an organic adhesive and an elastomer. In this way, the lithium ion battery fire suppressant 100 can be prepared in any form.

Figure 2:
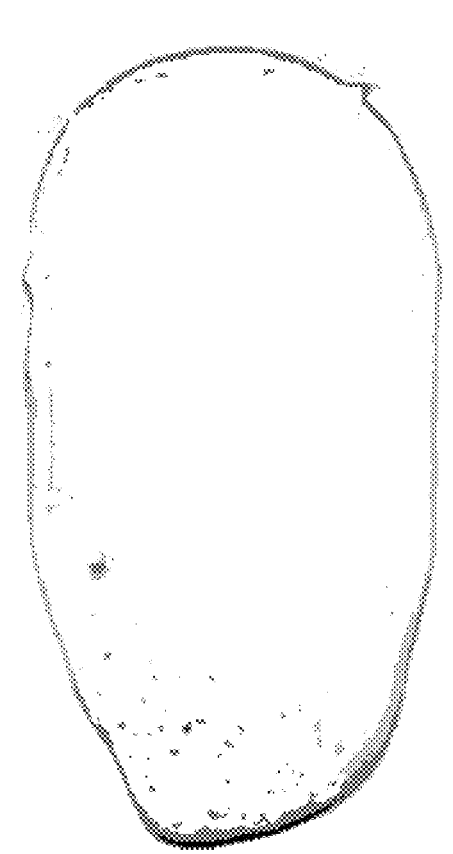
FIG. 2 is an image of the lithium ion battery fire suppressant in paste form according to one embodiment of the present invention.

FIG. 2 is an image of the lithium ion battery fire suppressant in paste form according to one embodiment of the present invention.

Referring to FIG. 2, the lithium ion battery fire suppressant may form a paste through mixing with the organic binder 120 including at least one selected from among an organic adhesive and rubber.

Specifically, the lithium ion battery fire suppressant of FIG. 2 is a mixture of 80 wt % of the extinguishing powder and 20 wt % of soft polyurethane as the organic binder 120.

Figure 4:
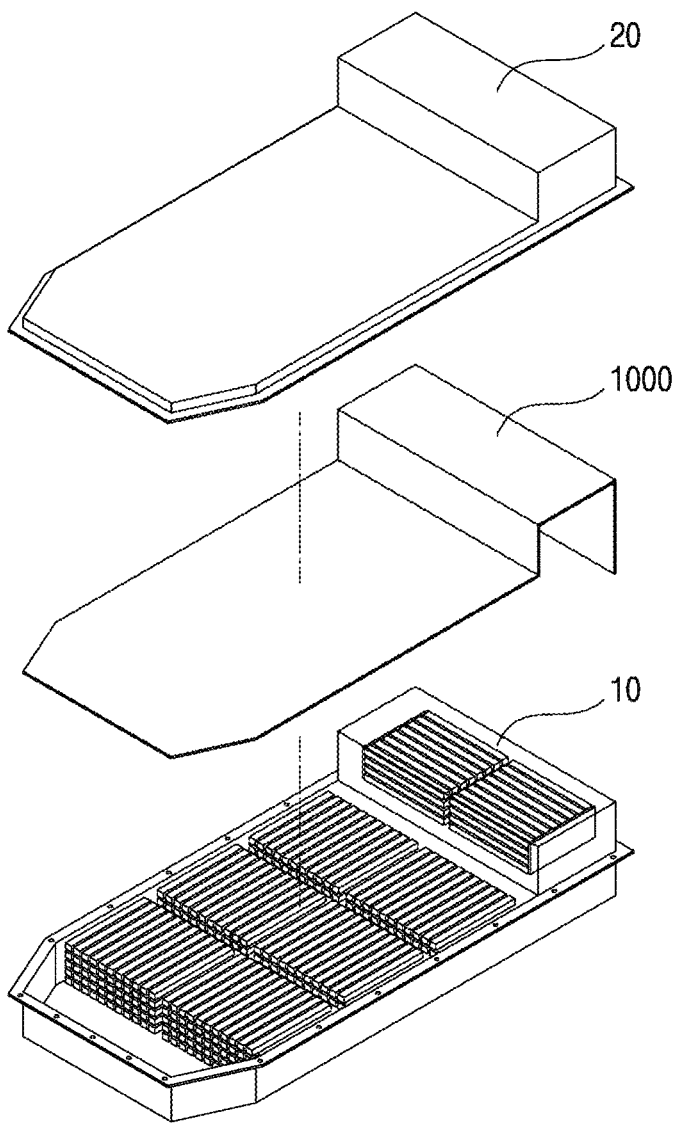
FIG. 4 is a view illustrating exemplary use of the lithium ion battery fire suppression sheet according to one embodiment of the present invention.

The lithium ion battery fire suppressant in paste form may be applied to or coated onto an inner surface of a case that houses a lithium ion battery (the case corresponding to a battery pack cover 20 in FIG. 4).

When a fire occurs in a lithium ion battery and the temperature of the lithium ion battery increases and reaches a temperature range determined to be dangerous, each carbonate powder constituting the extinguishing powder sequentially decomposes depending on the decomposition initiation temperature thereof and produces carbon dioxide and cationic metal ions.

In this way, supply of oxygen to a flammable gas from the lithium ion battery can be cut off due to suffocating properties of carbon dioxide. In addition, lithium, which would otherwise act as an ignition source, is converted into lithium carbonate to become non-flammable and the cationic metal ions absorb radicals generated from an electric spark, thereby suppressing the spread of the fire.

The lithium ion battery fire suppressant may be prepared in elastomer form through mixing with the organic binder including rubber. The lithium ion battery fire suppressant in elastomer form may be molded into a pad.

When multiple lithium ion batteries are provided, the lithium ion battery fire suppressant pad may be disposed between at least one pair of adjacent lithium ion batteries.

When a fire occurs in the lithium ion battery and the temperature of the lithium ion battery increases and reaches a temperature range determined to be dangerous, each carbonate powder constituting the extinguishing powder sequentially decomposes depending on the decomposition initiation temperature thereof to produce carbon dioxide and cationic metal ions. In this way, it is possible to suppress or cut off the spread of the fire.

In addition, the lithium ion battery fire suppressant 100 may further include solid powder, as needed.

Figure 3:
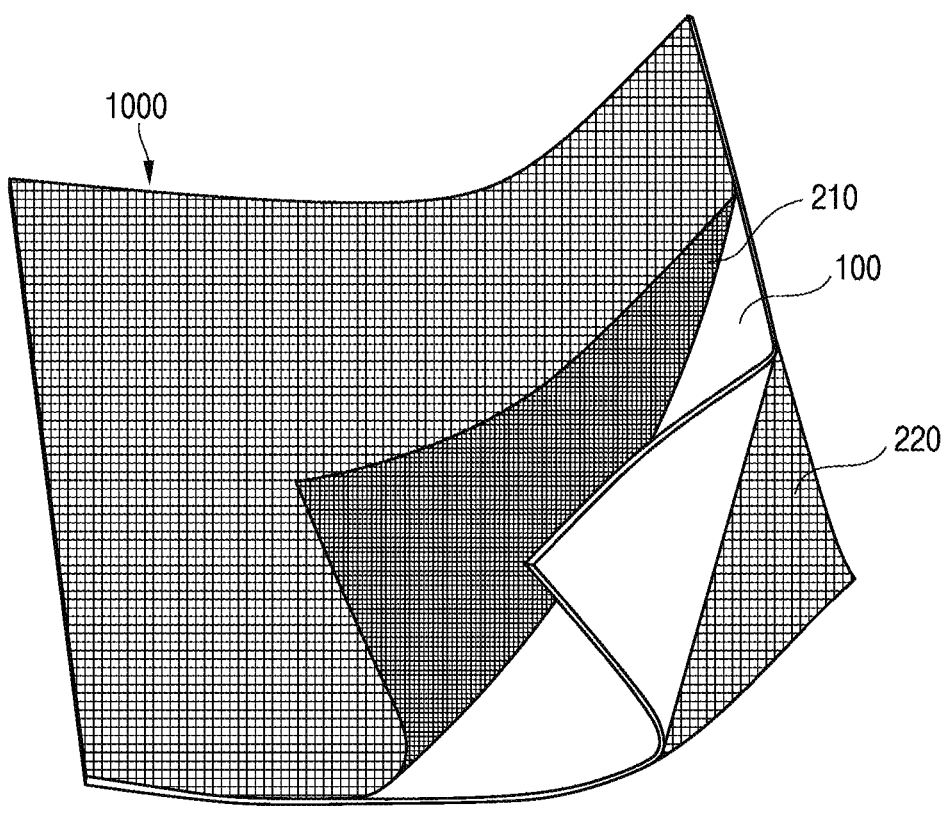
FIG. 3 is a schematic view of a lithium ion battery fire suppression sheet according to one embodiment of the present invention.

FIG. 3 is a schematic view of a lithium ion battery fire suppression sheet according to one embodiment of the present invention, and FIG. 4 is a view illustrating exemplary use of the lithium ion battery fire suppression sheet according to one embodiment of the present invention.

Referring to FIG. 3 and FIG. 4, a lithium ion battery fire suppression sheet 1000 may include a pair of fiber sheets 210, 220 and a lithium ion battery fire suppressant 100.

The pair of fiber sheets 210, 220 may be non-flammable fiber sheets.

The lithium ion battery fire suppressant 100 may be disposed between the pair of fiber sheets 210, 220.

In this embodiment, the lithium ion battery fire suppression sheet 1000 may be formed by coating the lithium ion battery fire suppressant 100 in paste form onto one fiber sheet 220, followed by covering the one fiber sheet with the other fiber sheet 210. Coating of the lithium ion battery fire suppressant 100 in paste form may be performed using a coater.

Alternatively, the lithium ion battery fire suppression sheet 1000 may be formed by molding the lithium ion battery fire suppressant 100 into a pad, followed by attaching the pair of fiber sheets 210, 220 to opposite surfaces of the lithium ion battery fire suppressant pad.

The lithium ion battery fire suppression sheet 1000 may cover at least a portion of a lithium ion battery. Referring to FIG. 4, the lithium ion battery fire suppression sheet 1000 may cover a battery pack 10 inside a battery pack cover 20.

When a fire occurs in the lithium ion battery and the temperature of the lithium ion battery increases and reaches a temperature range determined to be dangerous, each carbonate powder constituting the extinguishing powder sequentially decomposes depending on the decomposition initiation temperature thereof to produce carbon dioxide and cationic metal ions. In this way, it is possible to suppress or cut off the spread of the fire.

Figure 5:
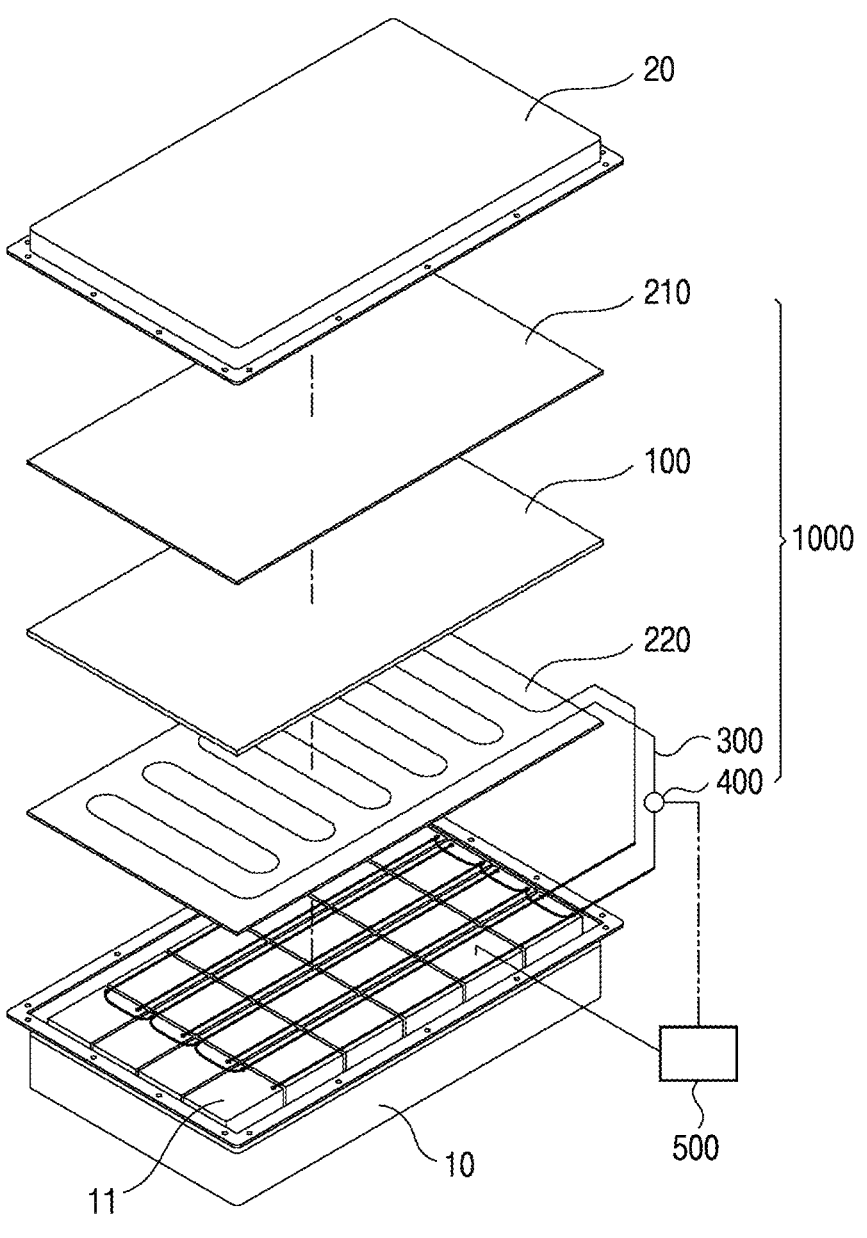
FIG. 5 is a view illustrating another exemplary use of the lithium ion battery fire suppression sheet according to one embodiment of the present invention.

FIG. 5 is a view illustrating another exemplary use of the lithium ion battery fire suppression sheet according to one embodiment of the present invention.

Referring to FIG. 5, a lithium ion battery fire suppression sheet 1000 may include a pair of fiber sheets 210, 220, a lithium ion battery fire suppressant 100, a heating wire 300, and a switch 400.

The pair of fiber sheets 210, 220 and the lithium ion battery fire suppressant 100 may be the same as those described in FIG. 3 and FIG. 4.

The heating wire 300 may be disposed on one fiber sheet 220 of the pair of fiber sheets 210, 220. The heating wire 300 may directly contact the lithium ion battery fire suppressant 100. In addition, the heating wire 300 may be connected to a lithium ion battery 11.

The switch 400 may be connected to the heating wire 300. Preferably, the switch 400 is connected to the heating wire 300 outside the fiber sheet 220.

When a detected temperature of the lithium ion battery exceeds a predetermined maximum allowable temperature, the switch 400 may allow electric current to be supplied from the lithium ion battery 11 to the heating wire 300 disposed on the fiber sheet 220 so as to heat the heating wire 300. Here, the heating wire 300 may undergo Joule heating. In addition, the maximum allowable temperature may be a temperature determined to be dangerous by a user.

Accordingly, when a fire occurs and the temperature of the lithium ion battery exceeds the maximum allowable temperature, electric current is applied from the lithium ion battery 11 to the heating wire 300 to heat the heating wire 300. Then, the extinguishing powder decomposes by heat from the heating wire 300.

Here, the heating wire 300 may be heated to a temperature corresponding to the lowest value among the decomposition initiation temperatures of respective carbonate powders constituting the extinguishing powder, such that a powder having the lowest decomposition initiation temperature can decompose first. If the fire is not extinguished by a primary extinguishing operation, the temperature of the lithium ion battery continues to increase. Then, a secondary extinguishing operation and, if applicable, a tertiary extinguishing operation may be performed.

The switch 400 may be operated upon detection of a temperature determined to be dangerous by a user. In this way, a temperature at which an extinguishing process by means of the lithium ion battery fire suppression sheet 1000 is initiated can be easily and accurately set to correspond to various temperatures determined to be dangerous by different users.

For example, the switch 400 may include a bimetal capable of automatically implementing a temperature-dependent switching operation.

In addition, the lithium ion battery fire suppression sheet 1000 may further include a temperature sensor 500. In this case, the switch 400 may be configured to perform a switching operation based on the temperature detected by the temperature sensor 500.

Alternatively, the lithium ion battery fire suppression sheet 1000 may use other sensing variables than temperature. For example, the lithium ion battery fire suppression sheet 1000 may use pressure as the sensing variable.

When the lithium ion battery fire suppression sheet 1000 uses pressure as the sensing variable, the lithium ion battery fire suppression sheet 1000 may further include a pressure sensor (not shown).

The pressure sensor may detect an internal pressure of the lithium ion battery 11. When the internal pressure of the lithium ion battery 11 increases due to a fire in the lithium ion battery 11 and a detected pressure exceeds a predetermined maximum allowable pressure, the switch 400 allows electric current to be supplied from the lithium ion battery 11 to the heating wire 300 disposed on the fiber sheet 220 so as to heat the heating wire 300.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. For example, components described as implemented separately may also be implemented in combined form, and vice versa.

The scope of the present invention is indicated by the following claims and all changes or modifications derived from the meaning and scope of the claims and equivalents thereto should be construed as being within the scope of the present invention.

The invention claimed is:

1. A lithium ion battery fire suppressant for suppressing a fire of a lithium ion battery, comprising:

an extinguishing powder for delaying fire propagation in association with fire extinguishing operations, the extinguishing powder comprising:

an ammonium-based inorganic carbonate powder configured to perform a primary extinguishing operation at a first temperature and comprising one selected from ammonium carbonate ($(NH_4)_2CO_3$) and ammonium bicarbonate ($NH_4HCO_3$), an alkali metal inorganic carbonate powder configured to perform a secondary extinguishing operation at a second temperature higher than the first temperature and comprising one selected from the group consisting of sodium carbonate ($Na_2CO_3$), sodium bicarbonate ($NaHCO_3$), and potassium bicarbonate ($KHCO_3$), and an alkaline earth metal inorganic carbonate powder configured to perform a tertiary extinguishing operation at a third temperature higher than the second temperature and comprising one selected from the group consisting of magnesium carbonate ($MgCO_3$), calcium carbonate ($CaCO_3$), and calcium bicarbonate ($Ca(HCO_3)_2$); and an organic binder mixed with the extinguishing powder, the organic binder includes one or more selected from organic adhesives and elastomers.

2. The lithium ion battery fire suppressant according to claim 1, wherein the lithium ion battery fire suppressant is prepared in paste form to be applied to an inner surface of a case housing the lithium ion battery.

3. The lithium ion battery fire suppressant according to claim 1, wherein:

the lithium ion battery fire suppressant is molded into a pad having elasticity; and when multiple lithium ion batteries are provided, the pad is disposed between at least one pair of adjacent ones of the lithium ion batteries.

4. A lithium ion battery fire suppression sheet comprising:

a pair of fiber sheets; and a lithium ion battery fire suppressant for suppressing a fire of a lithium ion battery, the lithium ion battery fire suppressant being disposed between the pair of fiber sheets and comprising:

an extinguishing powder for delaying fire propagation in association with fire extinguishing operations, the extinguishing powder comprising:

an ammonium-based inorganic carbonate powder configured to perform a primary extinguishing operation at a first temperature and comprising one selected from ammonium carbonate ($(NH_4)_2CO_3$) and ammonium bicarbonate ($NH_4HCO_3$), an alkali metal inorganic carbonate powder configured to perform a secondary extinguishing operation at a second temperature higher than the first temperature and comprising one selected from the group consisting of sodium carbonate ($Na_2CO_3$), sodium bicarbonate ($NaHCO_3$), and potassium bicarbonate ($KHCO_3$), and an alkaline earth metal inorganic carbonate powder configured to perform a tertiary extinguishing operation at a third temperature higher than the second temperature and comprising one selected from the group consisting of magnesium carbonate ($MgCO_3$), calcium carbonate ($CaCO_3$), and calcium bicarbonate ($Ca(HCO_3)_2$), and an organic binder mixed with the extinguishing powder, the organic binder includes one or more selected from organic adhesives and elastomers.

5. The lithium ion battery fire suppression sheet according to claim 4, wherein the lithium ion battery fire suppression sheet covers at least a portion of a lithium ion battery.

6. The lithium ion battery fire suppression sheet according to claim 4, further comprising:

a heating wire disposed on one of the pair of fiber sheets and connected to the lithium ion battery; and a switch connected to the heating wire and allowing electric current to be supplied from the lithium ion battery to the heating wire disposed on the fiber sheet upon detection of a temperature exceeding a predetermined maximum allowable temperature so as to heat the heating wire.

* * * * *